United States Patent [19]

Leopold

[11] Patent Number: 4,926,796
[45] Date of Patent: * May 22, 1990

[54] GROOMING DEVICE
[75] Inventor: Arthur B. Leopold, Secaucus, N.J.
[73] Assignee: Tarel Seven Design, Inc., Secaucus, N.J.
[*] Notice: The portion of the term of this patent subsequent to May 31, 2005 has been disclaimed.
[21] Appl. No.: 268,005
[22] Filed: Nov. 7, 1988

Related U.S. Application Data

[63] Continuation of Ser. No. 172,707, Mar. 24, 1988, Pat. No. 4,807,569, which is a continuation of Ser. No. 934,201, Dec. 18, 1986, Pat. No. 4,747,371.

[51] Int. Cl.⁵ .............................................. A01K 13/00
[52] U.S. Cl. ...................................... 119/83; 119/157
[58] Field of Search ...................... 119/29, 83, 85, 86, 119/88, 93, 156, 157; 15/238, 215, 216, 36, 37, 266; 132/263, 273, 275, 278

[56] References Cited

U.S. PATENT DOCUMENTS

| | | | |
|---|---|---|---|
| 439,435 | 10/1890 | Sherman | 119/86 |
| 715,611 | 1/1901 | Schenker et al. | 132/275 X |
| 717,499 | 2/1902 | Gouy | 132/275 X |
| 1,012,117 | 8/1911 | Witherell | 119/86 |
| 2,699,789 | 1/1955 | Goodman | 132/278 |
| 2,718,873 | 5/1954 | Buckner | 119/295 |
| 3,211,160 | 12/1960 | Miller | 132/275 |
| 4,747,371 | 5/1988 | Leopold | 119/83 |
| 4,807,569 | 2/1989 | Leopold | 119/83 |

FOREIGN PATENT DOCUMENTS

| | | | |
|---|---|---|---|
| 3036311 | 5/1982 | Fed. Rep. of Germany | 119/86 |
| 2523421 | 9/1983 | France | 132/275 |

Primary Examiner—John Weiss
Attorney, Agent, or Firm—Grimes & Battersby

[57] ABSTRACT

A toothed plate securable to a wall, corner or other supporting fixture defining an animal grooming device usable by the animal without human intervention. An aperture plate having holes positioned to correspond to the location of the teeth on the toothed plate mesh with the teeth and cover a portion of each tooth for providing added strength to and stiffening of each tooth when closed, a teeth straightening function upon opening and closing the two plates and a teeth cleaning function upon opening of the plates. A container for holding an animal attracting material is provided.

6 Claims, 3 Drawing Sheets

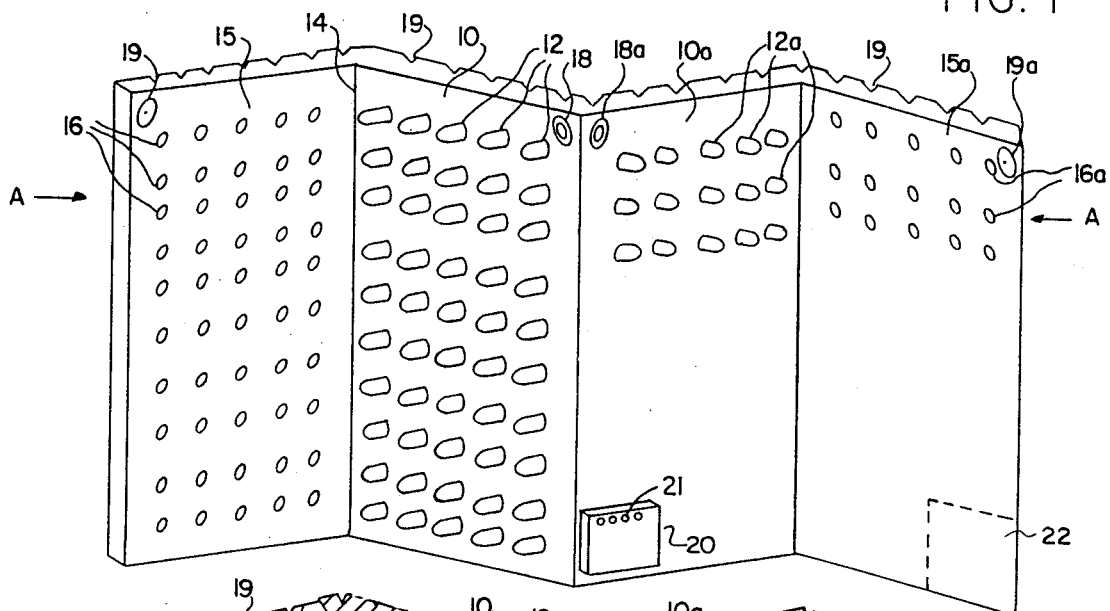
FIG. 1
FIG. 2
FIG. 3
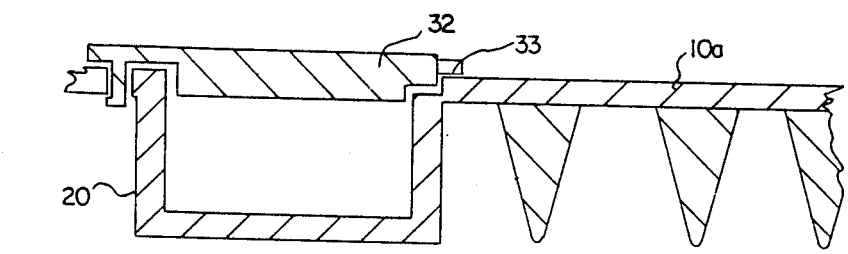
FIG. 8

GROOMING DEVICE

This is a continuation of co-pending application Ser. No. 07/172,707 filed on Mar. 24, 1988, now U.S. Pat. No. 4,807,569, which issued on Feb. 28, 1989, which is a continuation of application Ser. No. 06/934,201, filed Dec. 18, 1986, now U.S. Pat. No. 4,747,371, which issued on May 31, 1988.

BACKGROUND OF THE INVENTION

1. Field of the Invention

The present invention relates to grooming devices for animals. The grooming devices of the present invention is particularly useful in connection with pet cats, although its use in connection with other animals is anticipated. The present invention also relates to appliances useful for the enjoyment and exercise of pets and other domesticated animals.

2. Description of the Prior Art:

The prior art is basically directed to two types of grooming devices. One type of grooming device is used by animals and may be identified as "walk-through" devices. These are devices that the animal may walk or crawl through and rake or brush itself and/or scratch itself during walk-through process. Examples of "walk-through" animal use devices are found in U.S. Pat. Nos. 1,568,226; 1,582,144; 2,865,329; 2,976,841; and 4,301,766, for example. A second type of grooming device is used on animals and may be identified as "man used" devices. The "man used" devices generally include grooming or cleaning devices such as brushes or combs and are used on animals by humans for grooming and/or cleaning purposes. Examples of devices used by humans on animals may be found in U.S. Pat. Nos. 676,358; 2,660,183; 2,865,039; 2,881,460; and 3,059,259, for example.

The "walk-through" animal use devices although useful in the grooming of the coat of an animal is generally bulky and often needs to be adjusted to fit the animal which is going to use the device, especially when a "walk-through" animal use device is used in geographic areas which have extremes in weather conditions and the coat of the animal, which is going to use the device, thickens and/or thins, with the change in seasonal temperatures. Man-used devices, such as brushes, combs and curry-combs are extremely useful in final grooming but time and attention are required by a person to use these devices on animals as these devices can not be left for use by the animal itself.

SUMMARY OF THE INVENTION

The present invention is an animal use grooming and animal enjoyment device adapted to be used by the animal but avoids the bulk and the need for adjustment that is associated with animal "walk-through" devices. The present invention is an animal grooming and animal enjoyment device primarily useful for home use by house pets such as cats, for example wherein the device may be attached to a wall or other surface or the leg or side of a piece of furniture and virtually became part of the wall or furniture as far as space is concerned. The present invention may also be used as a free-standing device, if desired. As a device to be used by the animal or pet itself, this avoids the need of human attention as required by manually used or "man used" brushes or combs for grooming the animal. In addition since the present invention is for use by the animal, the animal may take advantage of using the device when ever it wishes, without human intervention. Thus, the present invention has several advantages over the prior art.

Generally, the present invention is embraced in the structure of a toothed plate or surface in which a plurality of substantially identical teeth are disposed over and protrude from the surface of a plate, forming a toothed plate or surface. Preferably the teeth are conical in shape and extend from the surface of the supportive plate from approximately one half ($\frac{1}{2}''$) of an inch to three quarters ($\frac{3}{4}''$) of an inch, plus or minus one sixteenth (1/16") of an inch, as desired. In addition to the toothed plate is a tooth cleaning and tooth strengthening plate or aperture plate which includes a plate surface in which are positioned a plurality of conical shaped holes, spaced to conform with the position of the teeth on the toothed plate. Each conical hole in the holed plate is positioned so that when the toothed plate and the aperture of holed plate are in alignment, a particular tooth on the toothed plate enters a particular conical hole in the holed plate such that when the two surfaces of the two plates are in closed relationship the teeth of the toothed plate enter the holes of the holed plate and beyond the back surface of the holed plate, extending therefrom.

The holes in the aperture plate are such so as to fit over and surround part of each individual tooth on the toothed plate thereby providing a strengthening, straightening and stiffening function relative to each tooth, when the two plates are closed. The holes in the holed plate are contoured and are of such fit as to straighten any tooth upon separation of the plates and to remove hair and dirt retained on the teeth through use of the grooming device by an animal.

The conical shape of the hole provides a wide aperture for capturing a tooth which may be somewhat bent or non-straight since the wide part of the conical shape aperture is the part of the aperture the tooth enters upon closure of the two mateable plates.

When the toothed plate and the aperture plate are in closed condition with respect to each other, the various aperture surround the base and lower stem of a corresponding tooth providing support at the base of the tooth and giving strength and stiffness to the tooth.

The toothed plate may be made out of any plastic, rubber or combination thereof which may offer the wear resistance needed for such device. In using some materials, such as rubber or flexible plastic, for example, it will be found that the toothed plate may be easily bent to conform to any non-planar surface to which it is desired to secure the toothed plate. If the toothed plate is made of a relatively stiff on ridged material, such as fiber glass or other stiff plastic, for example, it may be desired to groove the back of the plate so that the plate may be easily bent or curved to conform to any non-planer surface to which the plate is to be secured or affixed. The use of a particular suitable material is a matter of choice. However, being able to bend or curve the base plate so as to conform to the contour of a supportive structure, such as a wall, door frame or corner, for example is desirable so as to increase the utility of the self grooming device in respect of its locatability in a household for example, for use by a household pet.

The toothed plate may be in flat configuration and may be secured and/or supported against a wall or may have a mounting base and be free standing. The toothed plate may be somewhat stiff or ridged in characteristic and resist bending. A bendable toothed plate may be used to surround the leg of a chair or other piece of furniture or may be affixed to and supported by a corner or wall which is other than planar.

The aperture plate may have bending characteristics similar to those enjoyed by the toothed plate so that the aperture plate may easily conform to the contour of the toothed plate.

A free standing form of the present invention may be in flat configuration or take the form of a tube or cylinder having a supportive base.

It is therefore an object of the invention to provide a self-grooming animal grooming device for use by an animal in which the animal is not required to pass through supportive structure.

Another object is to provide a grooming device for use by animals which device is self cleaning.

A further object is to provide a self-use animal grooming device which includes a planar grooming area or surface.

A still further object is to provide an animal grooming device for use by the animal which includes a toothed plate grooming surface and an aperture plate for reinforcing the teeth on the toothed plate.

Still another object is to provide an animal self-grooming device that may be removably secured to a wall or furniture part for easy access by the animal and easy removal for cleaning.

These and other objects will become apparent when reading the following detailed description of the invention with reference to the drawings in which:

BRIEF DESCRIPTION OF THE DRAWINGS

FIG. 1 is a representation of one form of the invention;

FIG. 2 is a cross-section view of the representation in FIG. 1 along line A—A;

FIG. 3 is a cross-section view of FIG. 1 along line A—A with the aperture plates closed over the toothed plates;

FIGS. 8 and 8a are different embodiments of animal attraction material containers.

DETAILED DESCRIPTION OF THE INVENTION

Figures 4, 5:
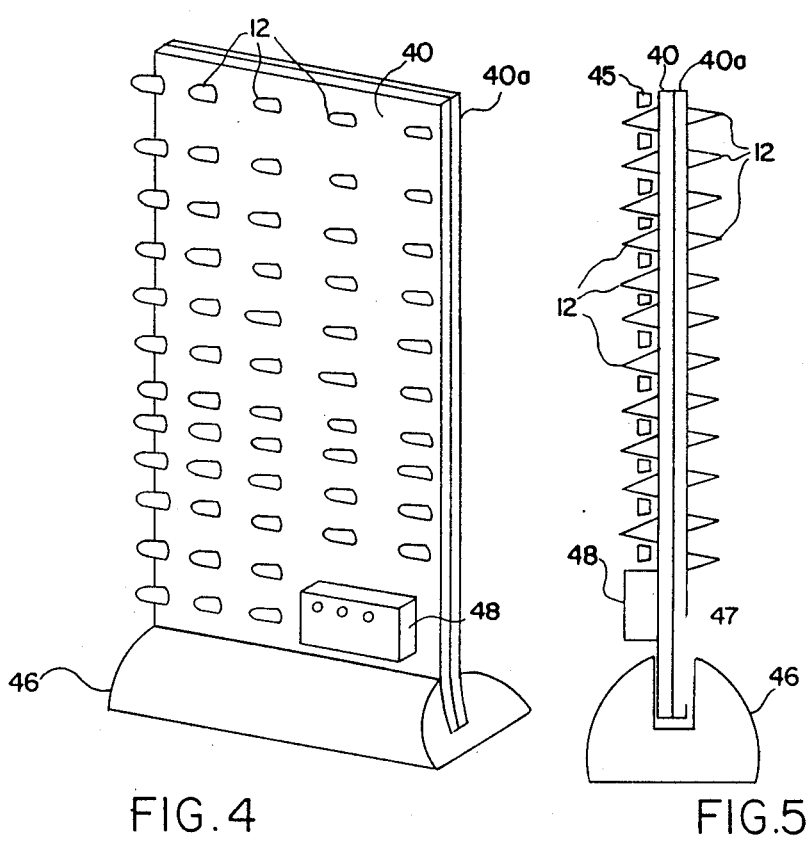
FIG. 4 is a representation of a free-standing form of the present invention.
FIG. 5 is a representation of a free-standing form of the invention as representation in FIG. 4, as viewed from the end of the structure.

It will be appreciated that the several drawings representing the invention are not intended to be in scale. It will further be appreciated that most animals, especially those which are essentially fully or partially covered with hair or fur, groom and/or scratch themselves. The present invention takes advantage of this characteristic in animals and provides a self-grooming device for animal use. Although not limited to home use, the present animal self-grooming device finds great utility when used in the home and is available for use by cats and/or dogs, normally retained in the home environment as pets, for example. Certainly the present self-grooming device may be used in other environments, such as kennels, dog-houses, barns and other places where animals are kept.

It will be appreciated that the animal grooming device of the present invention may be made in different sizes depending upon the size of the animal for whose use the grooming device is intended.

With the above in mind, attention is now directed to FIG. 1, a representation of a preferred embodiment in flat configuration may be bent somewhat so as to follow the contour of a retaining structure, such as a wall or door or side of a piece of furniture or other structure to which the grooming device may be affixed or secured.

The represented embodiment includes a pair of toothed plates 10 and 10a. On the surface of each plate and extending therefrom outwardly are a plurality of spaced teeth 12. Preferably the plurality of teeth are spaced both vertically and horizontally on each plate. The teeth are preferably substantially uniform in shape and size (both length and diameter) and are conical in shape, with the base of the tooth being the thickest in diameter, tapering along the stem of the tooth to a cone tip. The tip of the conical or cone shaped teeth is preferably blunt, as opposed to sharply pointed to avoid injury to the animal user.

For convenience of illustration plate 10a is shown with some teeth missing, while plate 10 is represented as having a full compliment of teeth. It will be appreciated that plate 10a would also have a full compliment of teeth. Certainly both toothed plates need not be identical in tooth compliment and the entire of the plate need not be covered with teeth. The surface of plates 10 and 10a may be toothed, as desired.

Toothed plate 10 is joined along its end 14 by aperture plate 15. The holed plate 15 has conical shaped, spaced holes 16. The spacing of the holes 16 on plate 15 correspond to a mirror image placement of the teeth 12 on plate 10 so that the plate 15 may be folded over and meshed or mated with the plate 10. This is seen in FIG. 3, for example, where the holed plates 15 and 15a are folded over the toothed plates 10, 10a and the teeth 12 protrude through the holes 16, 16a.

The inverse conical shape of the holes 16, 16a conform to the conical shape of the teeth 12, 12a so that when the plates 15, 15a are closed over the plates 10, 10a the material around the holes 16, 16a surround the base and part of the stem of a corresponding by positioned tooth, giving added strength and stiffness to the tooth. Since the holes 16, 16a are the reverse shape of the teeth 12, 12a, the tip of the individual teeth enter the large portion of the individual hole so that any tooth that was bent or was in any malalignment will be straightened as the tooth enters and passes through the hole in the corresponding mirrored position.

Included on the mating surfaces of the plates 10 and 15 are the two parts of a two-piece snap fastener 18/19 and 18a/19a. The two-piece snap fasteners serve to hold two plates 10/15 and 10a/15a together. Other means may be used to hold the two plates together, if desired.

The plates 10, 10a and 15, 15a include grooves 19 on the outer or back side of the plate which serve to provide a bending characteristic to the plates where the plates are constructed from material that resists bending.

The plates 10, 10a may be secured to a wall, or door or other surface by an adhesive (not shown) or some other means, such as screws or fasteners. If desired, suction cups, or a combination of pads of loops and pads of hooks, or other fastening devices may be used to affix and/or secure the plates to some surface.

When the self-use grooming device is to be used by a cat, for example, it may be desirable to provide additional insensitive for the cat to use the grooming device. This may be done by using catnip, a well known cat attractor. A container, 20 may be located on the plate 10a, for example, and may be filled with catnip. The container 20 may be opened from the rear, such as representation in FIG. 8. A door 32 may be hinge connected such as represented at 33 to the plate 10a and the door 32 may be closed and held in place by a post fastener, such as 34, with an enlarged head inserted into a hole. Venting, such as by holes 21 will permit the catnip aroma to be relieved from the container 20. The holed plate 15a may include a cut out 22 since there are no teeth in the area covered by the container 20, on the toothed plate 10a. Centrally locating the catnip container 20 is preferable because a cat usually rubs itself against a structure emitting catnip aroma. The container 20 may be omitted if desired.

FIG. 2 represents a cross section of the grooming device shown in FIG. 1 where the conical holes 19 may be clearly seen. Also more clearly seen are the grooves 16 on the back surfaces of the plates, the mating surfaces being considered the front surfaces.

FIG. 3 represents the grooming device in closed condition where the aperture plates 15 and 15a are closed or mated over the toothed plates 10 and 10a. The teeth 12 and 12a extend through and beyond the aperture plate, the holes 16 and 16a surrounding the teeth 12 and 12a in snug condition.

FIGS. 4 and 5 represent a flat free-standing embodiment of the animal used grooming device. The toothed plates 40 and 40a are positioned back-to-back and are mounted in the slot 47 of a mounting or stand 46. The teeth 12 extending from the surface of the plates 40 and 40a correspond to the teeth 12 (and/or 12a) in FIG. 1. FIG. 5 shows that the holed plate 45 may be positioned so that the teeth 12 of plate 40 extend through the holes.

It will be appreciated that when the self-use grooming device is used by an animal, such as a cat or dog, for example, the animal will rub or scratch its body against the teeth 12/12a. This will cause some hair and/or dirt on the animal's coat to be transferred to the teeth of the grooming device. When the holed plate (15 in FIG. 1 and 45 in FIG. 5) is removed from a closed position over the teeth, the teeth will be cleaned of hair and/or dirt left on the teeth by the animal's use of the grooming device. Also, any teeth that may have become bent due to the animal's use of the grooming device will be straightened as the holed plate is removed from the teeth.

Figure 8A:
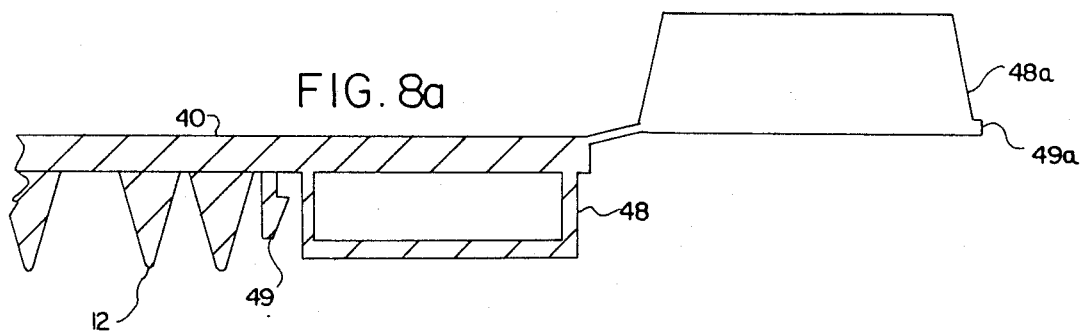

The free-standing, self-use animal grooming device represented in FIGS. 4 and 5 may include a container, such as 48, for retaining animal attracting material, such as catnip, for example, placed therein. FIG. 8a represents one embodiment of such container 48 which is attached to the toothed plate 40 with the top of the container open for receiving animal attracting material. A container top 48a may be hinge connected to the plate and include a lip 49a which, when the top is closed snaps beneath and is held captive by the tooth 49.

The container 48 may include holes on the side so as to permit escape of the animal attracting aroma of the animal attracting material. Alternatively, a container for placing animal attracting material therein may be located on the back side of the aperture plate.

Figure 7:
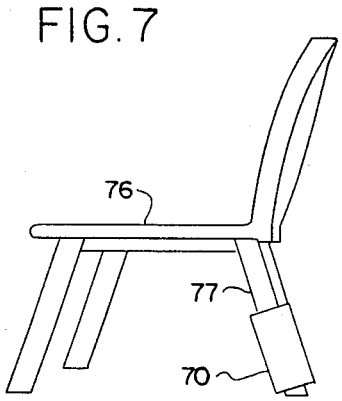
FIG. 7 is a representation of the invention used in conjunction with furniture.
Figure 6:
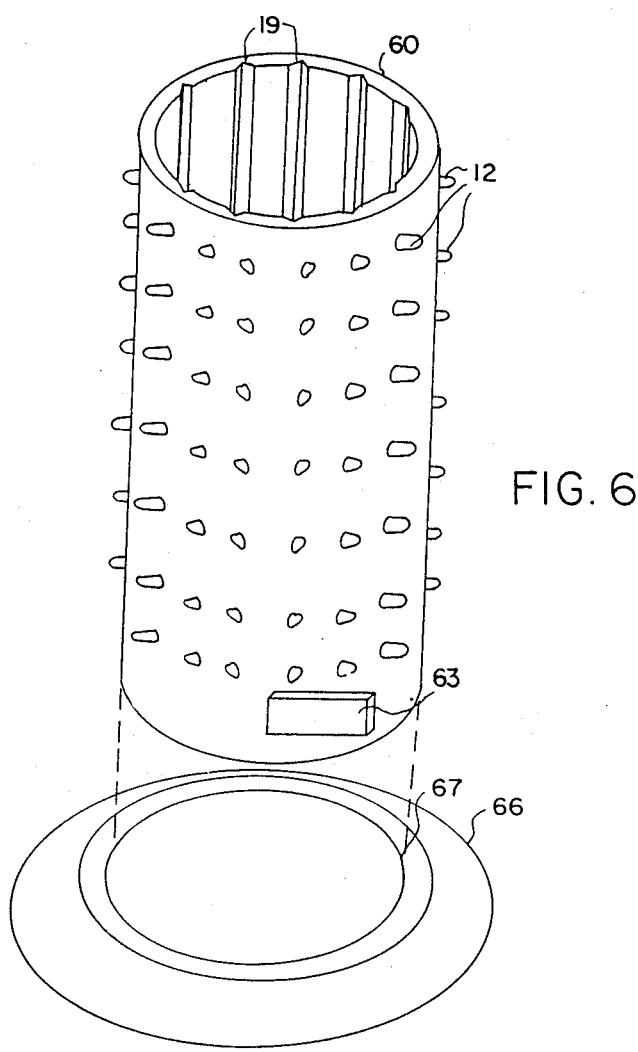
FIG. 6 is an alternative structure of a free-standing form of the invention.

Attention is now directed to FIGS. 6 and 7 in which another embodiment of the invention is disclosed in a free-standing structure and in a structure used on the leg of furniture.

The free-standing structure in FIG. 6 includes a tubular arrangement 60 with teeth 12 extending therefrom. For convenience of illustration the holed plate has been omitted but an aperture plate may be added and placed over the teeth of the cylindrical toothed arrangement 60. The holed plate may be added in sections rather than a one piece tube. The use of sections of aperture plate permits easy assembly and disassemble of the complete grooming device. The holed plate sections may be secured to the toothed cylinder 60 by snap fasteners, if desired.

In order that the tubular structure be made free-standing, a mounting 66 may be used with a circular groove 67 into which the cylindrical shaped toothed assembly 60 may be secured. If desired the mounting 66 may include a hole into which the lower part of the cylinder 60 may be inserted.

If desired, the tubular form of the animal grooming device may be placed over the leg of a piece of furniture, such as a chair 76 in FIG. 7. The chair 76 represents any piece of furniture that may have an exposed leg over which the tubular form of the invention may be placed. The grooves 19 enhance the bending characteristics of the material used which will permit the tubular structure to conform to non-round leg structures on furniture. The tube 70 on leg 77 represents a tubular shaped grooming device inserted over the leg of a chair or other furniture.

It will be appreciated that some of the materials from which the present invention may be fabricated are flexible materials suitable for bending. In the event that such flexible material is used to fabricate either or both the toothed plate or the aperture plate, grooves, such as 19 on the back side of the toothed plate may be eliminated.

It will be appreciated that an embodiment of the present invention may be secured to wall, corner, door, door frame, siding or other surface or to a leg or other part of a piece of furniture that places the device in some accessible position to the animal, for its use. Being a take-down device, cleaning of the grooming device is simplified.

It is known that cats, for example, have favorite walls, furniture legs or corners on which to rest and/or scratch themselves and the present animal self-grooming device may be secured to such "favorite spots" so as to provide a more favorable grooming device for the cat and, to keep the particular "favorite spot" of the cat, clean.

Cleaning and straightening of the teeth of the self grooming device is simplified by removing the holed or aperture plate from a closed position over the toothed plate. As the aperture plate is removed the material around the hole realigns any bent tooth as the tooth scrapes along the material forming the hole. The tooth is also scraped clean.

When the present animal self-use grooming device is used by an animal, the animal rubs or scratches itself on the teeth, thus grooming its coat. The grooming causes hair and dirt from the animal's coat to become attached to the teeth of the toothed plate. When the aperture plate is removed from the toothed plate some of the hair and dirt retained on the teeth of the toothed plate are removed from the teeth. Thus, the aperture plate effectively cleanses the teeth upon its removal from a closed position, over the teeth of the toothed plate. A simple brushing of the surface of the aperture plate cleans the surface of the aperture plate and makes the grooming device ready for reassembly.

Since the toothed plate may be removably secured to a wall, corner, door frame or furniture part with separatable fasteners, such as two part snap fasteners, hook and loop pads sometimes known as VELCRO fasteners, suction cups, screws or other separatable securing devices, a toothed plate so attached to a supportive structure, may be easily removed therefrom for further cleaning or for relocation.

Although several embodiments of the invention have been shown and described and some modifications have been suggested, other changes and modifications as will become apparent to those skilled in the art may be made without departing from the spirit of the invention.

What is claimed is:

1. An animal grooming device, comprising:
   plate means made of a material selected from a group consisting essential of plastic, rubber and a combination thereof, said plate means defining an area at which said plate means can be folded, said plate means including a pair of surface portions each having a plurality of teeth extending therefrom and each surface portion spaced apart from each other by said area;
   means for securing said plate to a support; and
   container means coupled to said plate for storing an aromatic substance for attracting the animal to said grooming device, wherein said container means has a surface with a plurality of holes therethrough for emitting the aroma of the aromatic substance when the aromatic substance is contained therein.

2. The grooming device according to claim 1, wherein said plate means includes a surface having said pair of surface portions thereon and spaced apart to define said area at which said plate means can be folded.

3. The grooming device according to claim 1, wherein each of said pair of surface portions is substantially flat.

4. The grooming device according to claim 1, wherein said aromatic substance is catnip.

5. The grooming device according to claim 2, wherein said plate means has a second surface opposite said surface, and wherein said second surface has groove means for facilitating folding of said plate means.

6. An animal grooming device, comprising:
   plate means made of a material selected from a group consisting essential of plastic, rubber and a combination thereof, said plate means defining an area at which said plate can be folded, said plate means includes a pair of substantially flat surface portions each having a plurality of teeth extending therefrom and each surface portion spaced apart from each other by said area, wherein said plurality of teeth are substantially equally spaced apart on each of said pair of surface portions;
   means for securing said plate to a support; and
   container means coupled to said plate for storing an aromatic substance for attracting the animal to said grooming device, wherein said container means has a surface with a plurality of holes therethrough for emitting the aroma of the aromatic substance when the aromatic substance is contained therein.

* * * * *